United States Patent
Adam et al.

(10) Patent No.: US 12,548,435 B2
(45) Date of Patent: Feb. 10, 2026

(54) SYSTEM AND METHOD FOR LONGITUDINAL CONTROL ON APPROACH TO A TRAFFIC CLUSTER

(71) Applicant: GM Global Technology Operations LLC, Detroit, MI (US)

(72) Inventors: Paul A. Adam, Milford, MI (US); Jeffrey Scott Parks, Ann Arbor, MI (US); Bryan M. Joyner, Clarkston, MI (US); Tetyana V. Mamchuk, Novi, MI (US); Jaehoon Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 115 days.

(21) Appl. No.: 18/413,970

(22) Filed: Jan. 16, 2024

(65) Prior Publication Data

US 2025/0232666 A1 Jul. 17, 2025

(51) Int. Cl.
*G08G 1/01* (2006.01)
*B60W 30/14* (2006.01)

(52) U.S. Cl.
CPC ......... *G08G 1/0112* (2013.01); *B60W 30/143* (2013.01); *B60W 2552/10* (2020.02); *B60W 2556/45* (2020.02)

(58) Field of Classification Search
CPC .............. G08G 1/0112; B60W 30/143; B60W 2556/45; B60W 2552/10
See application file for complete search history.

(56) References Cited

U.S. PATENT DOCUMENTS

| | | | |
|---|---|---|---|
| 8,547,250 B1 * | 10/2013 | Al-Mutawa | B60W 10/18 340/903 |
| 2005/0189163 A1 * | 9/2005 | Barton | B60T 8/1764 180/446 |
| 2019/0212749 A1 * | 7/2019 | Chen | G05D 1/0088 |
| 2021/0063167 A1 * | 3/2021 | Groh | B60W 60/0059 |
| 2021/0253128 A1 * | 8/2021 | Nister | G05D 1/646 |

(Continued)

FOREIGN PATENT DOCUMENTS

| | | |
|---|---|---|
| DE | 102017011299 A1 | 6/2019 |
| DE | 102018209388 A1 | 12/2019 |

*Primary Examiner* — Peter D Nolan
*Assistant Examiner* — Wae L Louie
(74) *Attorney, Agent, or Firm* — Honigman LLP; Matthew H. Szalach; Jonathan P. O'Brien (57) ABSTRACT

A system and method for longitudinal control on approach to a traffic cluster includes receiving sensor data detected by one or more sensors in communication with a vehicle, processing the sensor data to determine that it indicates an approaching cluster, and verifying the approaching cluster by comparing the approaching cluster to route data and determining that the approaching cluster does not correspond to the route data. The method also includes generating a cluster confidence score for the approaching cluster based on a number of objects included in the approaching cluster, and initiating an open-loop longitudinal response to the approaching cluster. The method further includes performing a transition optimization on the open-loop longitudinal response to determine a handoff point for the vehicle, and, at the handoff point, transitioning from the open-loop longitudinal response to a closed-loop longitudinal response.

20 Claims, 5 Drawing Sheets

(56) References Cited

U.S. PATENT DOCUMENTS

| | | | |
|---|---|---|---|
| 2022/0013006 A1* | 1/2022 | Srivastava | G08G 1/0141 |
| 2022/0081003 A1* | 3/2022 | Brown | B60W 30/143 |
| 2022/0091973 A1* | 3/2022 | Atmeh | G06F 11/3086 |
| 2022/0108610 A1* | 4/2022 | Dhillon | G08G 1/0116 |
| 2022/0297689 A1* | 9/2022 | Rehborn | G08G 1/0133 |
| 2022/0379917 A1* | 12/2022 | Henke | B60W 60/0027 |
| 2023/0341234 A1* | 10/2023 | Nister | B60W 60/001 |
| 2024/0095536 A1* | 3/2024 | Lin | G06N 3/084 |
| 2024/0425075 A1* | 12/2024 | Elliott | G06N 3/08 |
| 2024/0427325 A1* | 12/2024 | Elliott | G06N 3/006 |
| 2025/0232666 A1* | 7/2025 | Adam | B60W 30/143 |

\* cited by examiner

SYSTEM AND METHOD FOR LONGITUDINAL CONTROL ON APPROACH TO A TRAFFIC CLUSTER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a method for longitudinal control on approach to a traffic cluster. Generally, when cruise control (e.g., longitudinal control) for a moving vehicle is engaged, sensors located on the front of the vehicle continually receive sensor data to identify objects in the road that the vehicle may encounter. If the objects are easily identifiable (i.e., in a high fidelity region) as likely to impact the vehicle (i.e., are within a path of the vehicle), the cruise control may initiate a deceleration of the vehicle using a closed-loop control based on the incoming object. As such, the more notice the cruise control has of an incoming object, the more time it will have to decelerate the vehicle, preventing jarring a driver or passengers of the vehicle. Notably, objects positioned at extreme distances from a moving vehicle are generally difficult to confidently identify for the purposes of initiating or adjusting the deceleration of the moving vehicle. Accordingly, confident object detection beyond traditional sensor ranges may allow the vehicle to decelerate without interrupting the driver experience.

SUMMARY

One aspect of the disclosure provides a computer-implemented method for longitudinal control on approach to a traffic cluster that when executed on data processing hardware causes the data processing hardware to perform operations that include receiving sensor data detected by one or more sensors in communication with a vehicle, the sensor data identifying one or more data fragments located outside of a high fidelity region of the vehicle, and processing the sensor data to determine that the sensor data indicates an approaching cluster. Here, the approaching cluster includes two or more data objects identified in the one or more data fragments. The operations also include verifying the approaching cluster by comparing the approaching cluster to route data and determining that the approaching cluster does not correspond to the route data, generating a cluster confidence score for the approaching cluster, the cluster confidence score based on the number of objects identified in the approaching cluster, and initiating an open-loop longitudinal response to the approaching cluster based on the cluster confidence score. The operations further include performing a transition optimization on the open-loop longitudinal response to determine a handoff point for the vehicle and, at the handoff point, transitioning from the open-loop longitudinal response to a closed-loop longitudinal response.

Implementations of the disclosure may include one or more of the following optional features. In some implementations, the one more sensors in communication with the vehicle include at least one of a long range radar and a camera sensor. In some examples, the one or more sensors are disposed within the vehicle. In some implementations, the route data includes at least one of road geometry, lane counts, or established structures. In some examples, the cluster confidence score is further based on a duration of time that each of the number of objects identified in the approaching cluster is detected, a velocity of each of the number of objects identified in the approaching cluster, and the distance between the vehicle and the approaching cluster. In some implementations, initiating an open-loop longitudinal response to the approaching cluster includes determining a response level based on the cluster confidence score of the approaching cluster.

In some examples, performing the transition optimization on the open-loop longitudinal response to determine the handoff point for the vehicle includes identifying a target velocity based on a current velocity of the vehicle, and transitioning from the open-loop longitudinal response to the closed-loop longitudinal response when a velocity of the vehicle equals the target velocity. In these examples, the target velocity may further be based on a cluster velocity of the approaching cluster and a distance between the vehicle and the approaching cluster. In some implementations, the one or more data fragments are identified by more than one of the one or more sensors. In some examples, the operations further include updating a velocity of the vehicle when the one or more objects enter the high fidelity region of the vehicle.

Another aspect of the disclosure provides a system for longitudinal control on approach to a traffic cluster that includes data processing hardware and memory hardware in communication with the data processing hardware. The memory hardware stores instructions that when executed by the data processing hardware cause the data processing hardware to perform operations that include receiving sensor data detected by one or more sensors in communication with a vehicle, the sensor data identifying one or more data fragments located outside of a high fidelity region of the vehicle, and processing the sensor data to determine that the sensor data indicates an approaching cluster. Here, the approaching cluster includes two or more data objects identified in the one or more data fragments. The operations also include verifying the approaching cluster by comparing the approaching cluster to route data and determining that the approaching cluster does not correspond to the route data, generating a cluster confidence score for the approaching cluster, the cluster confidence score based on the number of objects identified in the approaching cluster, and initiating an open-loop longitudinal response to the approaching cluster based on the cluster confidence score. The operations further include performing a transition optimization on the open-loop longitudinal response to determine a handoff point for the vehicle and, at the handoff point, transitioning from the open-loop longitudinal response to a closed-loop longitudinal response.

This aspect may include one or more of the following optional features. In some implementations, the one more sensors in communication with the vehicle include at least one of a long range radar and a camera sensor. In some examples, the one or more sensors are disposed within the vehicle. In some implementations, the route data includes at least one of road geometry, lane counts, or established structures. In some examples, the cluster confidence score is further based on a duration of time that each of the number of objects identified in the approaching cluster is detected, a velocity of each of the number of objects identified in the approaching cluster, and the distance between the vehicle and the approaching cluster. In some implementations, initiating an open-loop longitudinal response to the approaching cluster includes determining a response level based on the cluster confidence score of the approaching cluster.

In some examples, performing the transition optimization on the open-loop longitudinal response to determine the handoff point for the vehicle includes identifying a target velocity based on a current velocity of the vehicle, and transitioning from the open-loop longitudinal response to the closed-loop longitudinal response when a velocity of the vehicle equals the target velocity. In these examples, the target velocity may further be based on a cluster velocity of the approaching cluster and a distance between the vehicle and the approaching cluster. In some implementations, the one or more data fragments are identified by more than one of the one or more sensors. In some examples, the operations further include updating a velocity of the vehicle when the one or more objects enter the high fidelity region of the vehicle.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors.

The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1:
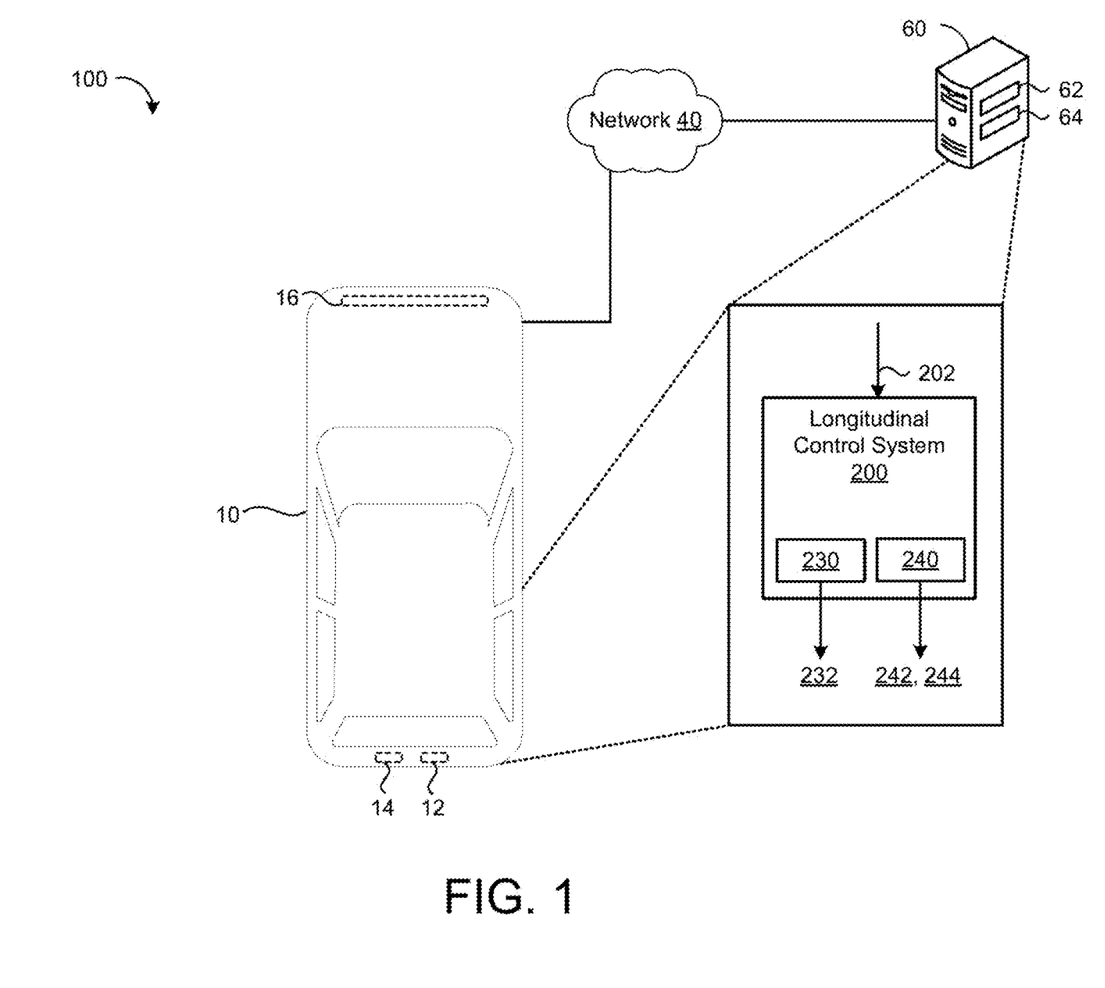
FIG. 1 is a schematic view of an example system for longitudinal control on approach to a traffic cluster.

FIG. 1 illustrates an example system 100 including a vehicle 10 and/or a remote system 60 in communication with the vehicle 10 via a network 40. The vehicle 10 and/or the remote system 60 executes a longitudinal control system 200 that operates when a user engages a cruise control function of the vehicle 10. In the examples shown, the longitudinal control system 200 is implemented within a vehicle 10. However, the longitudinal control system 200 can be implemented on other computing devices (e.g., computing devices in communication with the vehicle 10), such as, without limitation, a smart phone, tablet, smart display, desktop/laptop, smart watch, smart appliance, or smart glasses/headset. The vehicle 10 includes data processing hardware 12 and memory hardware 14 storing instructions that when executed on the data processing hardware 12 cause the data processing hardware 14 to perform operations. The vehicle 10 further includes one or more sensors 16 configured to capture/receive sensor data 202. The one or more sensors 16 may include one or more long range radar sensors and/or one or more camera sensors capable of capturing image data.

The remote system 60 (e.g., server, cloud computing environment) also includes data processing hardware 62 and memory hardware 64 storing instructions that when executed on the data processing hardware 62 cause the data processing hardware 62 to perform operations. In some examples, execution of the longitudinal control system 200 is shared across the vehicle 10 and the remote system 60. As described in greater detail below with reference to FIGS. 2 and 3, the longitudinal control system 200 executing on the vehicle 10 and/or the remote system 60 executes a cluster detector module 400, a verification module 210, a cluster scorer 220, an open-loop module 230, and a transition module 240. The longitudinal control system 200 is configured to receive sensor data 202 detected by one or more sensors 16 in communication with the vehicle 10 and generate an open-loop longitudinal response 232 and an optimized handoff point 242 for a velocity of the vehicle 10 to transition to a closed-loop longitudinal response 242 while minimizing disruption to a driver of the vehicle 10.

Figure 2:
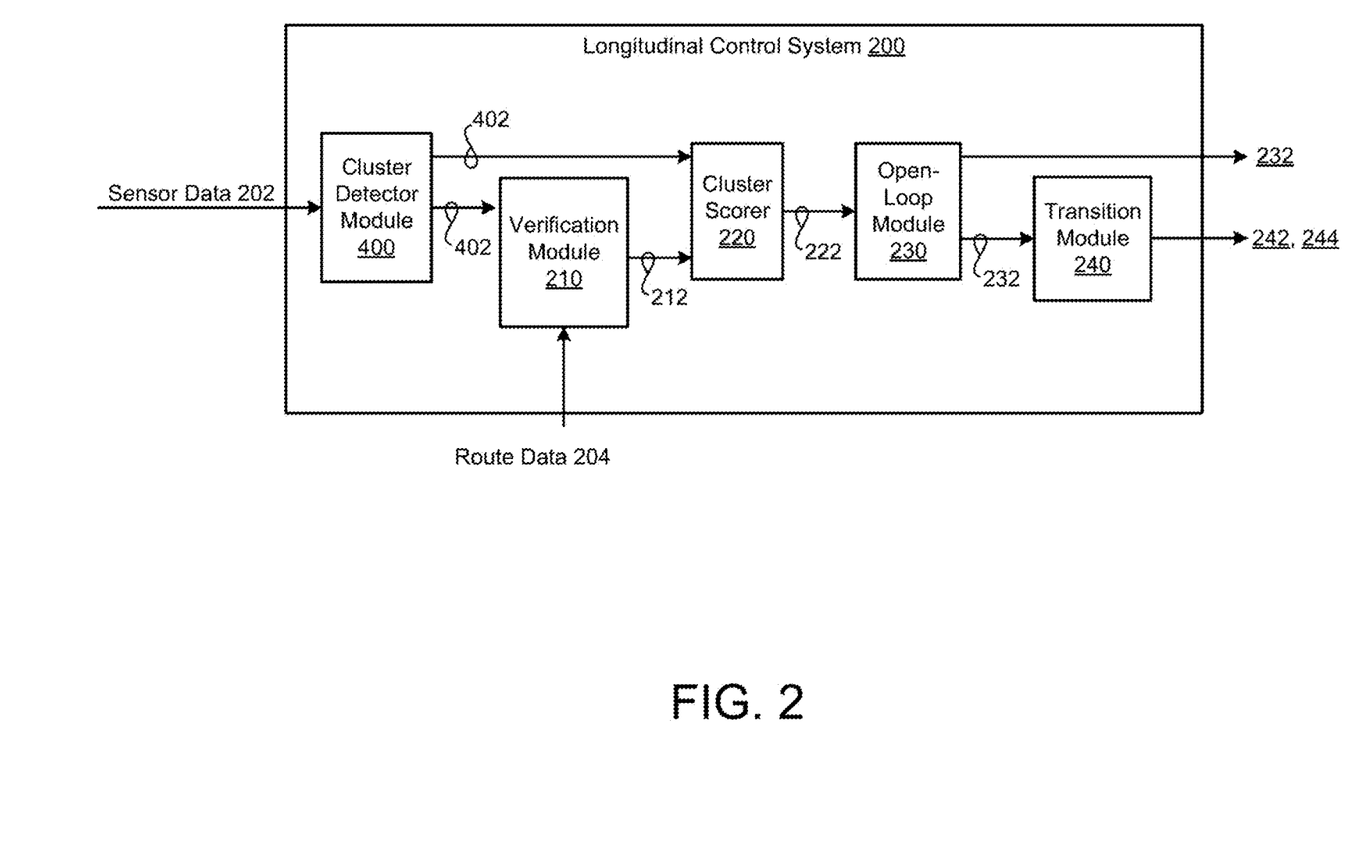
FIG. 2 is a schematic view of example components of the system of FIG. 1.
Figure 3:
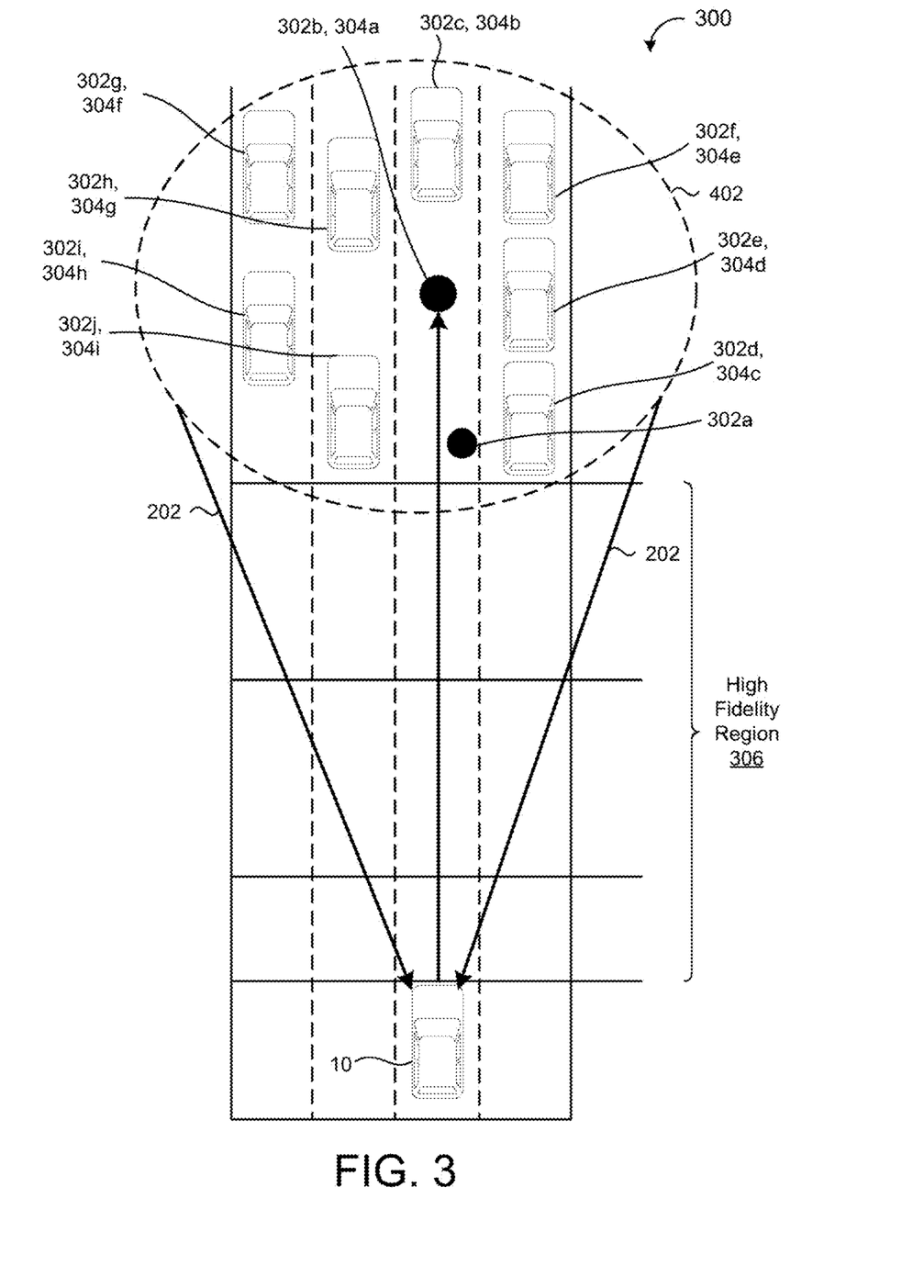
FIG. 3 is a schematic view a vehicle executing the system of FIG. 1 as it approaches a traffic cluster.

Referring to FIGS. 1-3, while the vehicle 10 is moving, the vehicle 10 executes the longitudinal control system 200 that receives, as input, the sensor data 202 detected by the one or more sensors 16 in communication with the vehicle 10. The sensor data 202 may include one or more data fragments 302 located outside of a high fidelity region 306 of the vehicle 10. The high fidelity region 306 may generally refer to a range or distance beyond the vehicle where the longitudinal control system 200 detects objects with a high confidence. Within the high fidelity region 306, closed-loop controls (i.e., standard adaptive cruise control) based on the closest in-path object to the vehicle 10 are generally sufficient for maintaining a safe speed and distance. For example, the high fidelity region 306 may include the space up to 120 meters ahead of the vehicle 10. However, in other implementations, the high fidelity region 306 may include any distance from the vehicle 10 that the longitudinal control system 200 can confidently detect objects. Because the sensor data 202 including the one or more data fragments 302 is located outside of (e.g., beyond) the high fidelity region 306, the one or more data fragments 302 may be particularly difficult to confirm as objects 304 in the path of the vehicle 10. To resolve the identity of the one or more data fragments 302, and in response to receiving the sensor data 202, the longitudinal control system 200 generates, as output, an open-loop longitudinal response 232 that initiates a gentle deceleration of a velocity of the vehicle 10, a handoff point 242 for the velocity of the vehicle 10, and a closed-loop longitudinal response 244 that initiates a secondary deceleration (e.g., standard cruise control) of the vehicle 10. Notably, the handoff point 242 for the vehicle 10 is optimized to minimize disruption and/or jarring to the driver and passengers within the vehicle 10.

Referring to FIGS. 2 and 3, the longitudinal control system 200 includes a cluster detector module 400 configured to process the sensor data 202 including the one or more data fragments 302 and, when one or more data fragments 302 are confirmed as a threshold number of detected objects 304, identify the detected objects 304 as a cluster 402 that the vehicle 10 is approaching. In some implementations, the cluster detector module 400 identifies the one or more data fragments 302 as an approaching cluster 402 when the cluster detection module 400 detects two (2) or more objects 304 in the one or more data fragments 302. For example, as shown in FIG. 3, the sensor data 202 includes three (3) data fragments 302a-302c within the path (e.g., lane) of the vehicle 10. Here, the cluster detector module 400 executes a classification model to determine whether the one or more data fragments 302 is accepted or rejected as a detected object 304.

Figure 4:
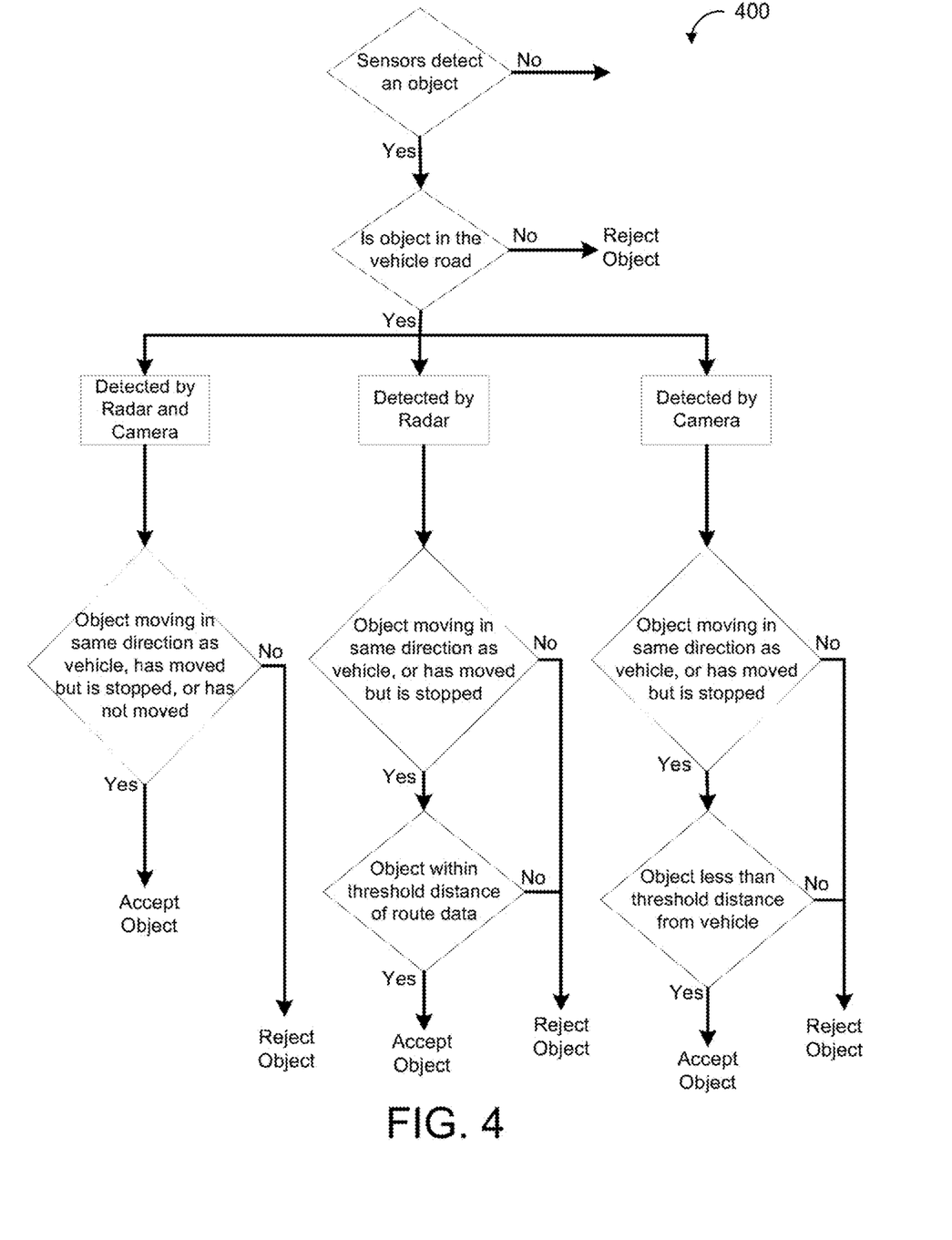
FIG. 4 is a classification flowchart for the system of FIG. 1.

Referring to FIG. 4, the classification model of the cluster detector module 400 is shown. Here, the cluster detector module 400 processes the received sensor data 202 including the one or more data fragments 302 and determines whether the sensor data 202 may include an object 304, and verifies whether the one or more data fragments 302 is within a lane on the road that the vehicle 10 is traveling. If the sensor data 202 does not include any data fragments 302, or the data fragments 302 are not within a lane on the same road as the vehicle 10, then it is rejected. If the data fragments 302 are within a lane on the same road as the vehicle 10, then the classification model determines which of the one or more sensors 16 of the vehicle detected the one or more data fragments 302. In particular, the classification model determines whether the data fragments 302 are detected by i) both radar sensors and camera sensors, ii) radar sensors only, or iii) camera sensors only. When the data fragments 302 are detected by radar sensors and camera sensors, the classification model determines whether the data fragments 302 are moving in a same direction as the vehicle 10, were previously moving but are currently stopped, or have not moved. If any of these conditions are met, then the data fragments 302 are accepted as a detected object 304. If none of these conditions are met, then the data fragments 302 are rejected.

When the data fragments 302 are detected by radar sensors only, the classification model determines whether the data fragments 302 are moving in a same direction as the vehicle 10, or were previously moving but are currently stopped. If none of these conditions are met, then the data fragments 302 are rejected. If any of these conditions are met, then the classification model determines whether the data fragments 302 are within a threshold distance of route data 204 of the vehicle 10. If the data fragments 302 are within the threshold distance of the route data 204, then the data fragments 302 are accepted as a detected object 304. If, however, the data fragments 302 are not within the threshold distance of the route data 204, the data fragments 302 are rejected. Similarly, when the data fragments 302 are detected by camera sensors only, the classification model determines whether the data fragments 302 are moving in a same direction as the vehicle 10, or were previously moving but are currently stopped. If none of these conditions are met, then the data fragments 302 are rejected. If any of these conditions are met, then the classification model determines whether the data fragments 302 are within a threshold distance from the vehicle 10. If the data fragments 302 are within the threshold distance of the vehicle 10, then the data fragments 302 are accepted as a detected object 304. If, however, the data fragments 302 are not within the threshold distance of the vehicle 10, the data fragments 302 are rejected.

Referring again to the example in FIG. 3, the sensor data 202 includes ten (10) data fragments 302a-302j within the same road as the vehicle 10. Specifically, three (3) data fragments 302a-302c are within the path (e.g., lane) of the vehicle 10, while seven (7) data fragments 302d-302j are within lanes adjacent (e.g., to the left and to the right) of the lane of the vehicle 10. Here, the cluster detector module 400 executes the classification model and, after processing the data fragments 302a-302j, determines whether the data fragments 302 form a sufficient number of detected objects 304 to indicate an approaching cluster 402. In particular, the cluster detector module 400 identifies/detects that the data fragments 302b-302j include objects 304a-304i. Conversely, the cluster detector module 400 identifies (e.g., via the classification model) that the data fragment 302a does not include an object. Based on the detected objects 304a-304i meeting (and exceeding) the threshold number (e.g., two objects 304), the cluster detector module 400 determines that the sensor data 202 indicates an approaching cluster 402.

Notably, the threshold number of objects 304 that the cluster detector module 400 detects to determine that the sensor data 202 indicates an approaching cluster 402 may be selectively modified based on the characteristics of the data fragments. For example, when a fragment 302 within the path of the vehicle 10 is confirmed as a detected object 304, the cluster detector 400 may apply a lower threshold number for determining that the sensor data 202 indicates an approaching cluster 402. Put another way, when the cluster classification model determines that a data fragment 302 in the same lane as the vehicle 10 is a detected object 304, the cluster detector 400 may apply a threshold of one (1) detected object 304 and determine that the data fragment 302 in the same lane as the vehicle 10 indicates an approaching cluster 402. Conversely, when the cluster classification model does not determine/identify any data fragments 302 within the same lane as the vehicle 10 (i.e., the data fragments 302 are placed within the road, but not within the same lane as the vehicle 10), the cluster detector module 400 may apply a higher threshold (e.g., six detected objects 304) when determining whether the sensor data 202 indicates an approaching cluster 402.

Referring again to FIG. 2, after the cluster detector module 400 determines that the sensor data 202 indicates an approaching cluster 402, the verification model 210 qualifies the detected approaching cluster 402 based on known route data 204. In particular, the verification module 210 receives the approaching cluster 402 including the sensor data 202, and route data 204, and verifies whether the approaching cluster 402 includes any known objects in the route data 204. The route data 204 may include one or more of the road geometry that the vehicle 10 is traveling on such as hills or speed bumps, lane counts of the road the vehicle is traveling on, or established/known structures such as bridges or traffic signs. In implementations where the route data 204 aligns with any of the detected objects 304 within the approaching cluster 402, the verification module 210 may discard the detected object 304. For example, if one of the detected objects 304 in the approaching cluster 402 corresponds to an overpass in the route data 204, the verification module 210 determines that the overpass is not an object that the vehicle 10 will come into contact with, and removes the object (i.e., the overpass) from the approaching cluster 402. Conversely, if the route data 204 does not correspond to any of the detected objects 304 in the approaching cluster 402, the verification module 210 verifies the approaching cluster 402.

Once the approaching cluster 402 is verified by the verification module 210, the longitudinal control system 200 generates a cluster confidence score 222 for the approaching cluster 402. In particular, a cluster scorer 220 of the longitudinal control system 200 receives, as input, the number of objects 304 identified in the approaching cluster 402 and generates, as output, a cluster confidence score 222 indicating a confidence that the approaching cluster 402 is actionable. Here, the cluster scorer 220 may additionally receive a duration of time that each of the detected objects 304 is in the approaching cluster, a velocity of each of the detected objects 304 in the approaching cluster 402, a distance between the vehicle 10 and the approach cluster 402, a number of detected objects 304 within the same lane as the vehicle 10, and/or a number of sensors 16 that reported/received sensor data 202. For example, when a detected object 304 in the approaching cluster 402 includes an object 304 that has been detected for an amount of time that exceeds the threshold amount of time, the cluster scorer 220 may generate a high cluster confidence score 222 for the approaching cluster 402.

After the cluster scorer 220 assesses the characteristics of the approaching cluster 402 and generates the cluster confidence score 222, the open-loop module 230 may identify an escalation level for the approaching cluster 402, and, based on the escalation level, generate an open-loop longitudinal response 232 to the approaching cluster 402. For example, the open-loop module 230 may include any number (e.g., three (3)) of escalation levels based on the cluster confidence score 222 and the sensor data 202. Here, the first escalation level may trigger/initiate an open-loop longitudinal response 232 including a gentle deceleration of the velocity of the vehicle 10, the second escalation level may trigger/initiate an open-loop longitudinal response 232 including a moderate deceleration of the velocity of the vehicle 10, and the third escalation level may trigger/initiate an open-loop longitudinal response 232 including a rapid deceleration of the velocity of the vehicle 10. For example, the open-loop module 230 may accumulate a timer for each detected object 304 in the lane of the vehicle 10 to determine how long the detected object 304 has been in the path of the vehicle 10. Here, each escalation level may include a different threshold amount of time for the detected object 304.

For example, the first escalation level may be selected when no detected objects 304 are within the same lane/path of the vehicle 10, and the time since the longitudinal response system 200 was detected is greater than a calibration threshold, and either i) there is a detected object 304 in the same road as the vehicle 10 and the number of detected objects 304 is greater than a counter threshold (e.g., two), or ii) a slow down is indicated by a navigation system (e.g., route data 204) and the number of detected objects 304 is greater than a counter threshold (e.g., two), or iii) the number of detected objects 304 is greater than a counter threshold (e.g., two). While in the first escalation level, the open-loop module 230 may continue to receive sensor data 202 and transition from the first escalation level to the second escalation level when the amount of time that the object 304 is detected exceeds a second level timer threshold. Here, the second level timer threshold may include a 2D calibration lookup table including axes of the number of detected objects 304 in the approaching cluster 402 and the velocity of the vehicle 10. While in the second escalation level, the open-loop module 230 may continue to receive sensor data and transition from the second escalation level to the third escalation level when the amount of time that the object 304 is detected exceeds a third level timer threshold. Here, the third level timer threshold may also include a 2D calibration lookup table including axes of the number of detected objects 304 in the approaching cluster 402 and the velocity of the vehicle 10. As noted above, the timer thresholds for each escalation level may be different. While in any of the escalation levels (e.g., escalation level one, two, and three), the open-loop module 230 may continue to receive sensor data 202 and disable the open-loop longitudinal response 232 when one of i) a vehicle in the path of the vehicle 10 is detected, ii) no object 304 is detected for the calibration threshold amount of time, iii) the number of detected objects 304 is less than the counter threshold (e.g., two objects 304), iv) the accumulating timer is greater than the calibration threshold amount of time, or v) the driver of the vehicle 10 overrides the open-loop longitudinal response 232 with the accelerator pedal or brake.

With continued reference to FIG. 2, once the open-loop module 230 receives the sensor data 202 and the cluster confidence score 222, the module 230 identifies the escalation level, and based on the escalation level, determines the open-loop longitudinal response 232. Thereafter, the longitudinal control system 320 initiates the open-loop longitudinal response 232, thereby initiating deceleration of the velocity of the vehicle 10. While the longitudinal control system 200 executes the open-loop longitudinal response 232, the transition module 240 performs a transition optimization on the open-loop longitudinal response 232 to determine a handoff point 244 for the vehicle 10 that avoids/limits abrupt changes in velocity between the open-loop longitudinal response 232 and a closed-loop longitudinal response 242. Here, the transition module 240 may identify a current velocity of the vehicle 10 and a target velocity of the vehicle 10 where the handoff point 244 creates a smooth transition between the open-loop longitudinal response 232 and the closed-loop longitudinal response 242. The handoff point 244 may be expressed by the following:

$$V_k \sim [V_{vehicle}, \Delta V_{cluster}, d_{cluster}]. \qquad (1)$$

Here, $V_k$ denotes the handoff point 244 expressed as a handoff velocity of the vehicle 10 where the longitudinal control system ideally switches from open-loop controls to closed-loop controls, $V_{vehicle}$ denotes the current velocity of the vehicle 10, $\Delta V_{cluster}$ denotes the difference in velocity between the vehicle 10 and the approaching cluster 402, and $d_{cluster}$ denotes the distance between the vehicle 10 and the approaching cluster 402.

Here, the transition module 240 determines the handoff point 244 (i.e., $V_k$), by first determining a motion profile of the vehicle 10 and the approaching cluster 402. The motion profile of the vehicle 10 may be expressed by following quintic polynomial [V(t), x(t)]:

$$V(x) = c_0 + c_1 x + c_2 x^2 + c_3 x^3 + c_4 x^4 + c_5 x^5, \qquad (2)$$

where Equation 2 is solved for $c_0, c_1 x, c_2 x^2, c_3 x^3, c_4 x^4, c_5 x^5$ given $V, \dot{V}, \ddot{V}|v_i v_f$. Based on the solved [V, x], the transition module 240 calculates the deceleration, as follows:

$$a = \frac{V_f^2 - V_i^2}{2\Delta x}, \qquad (3)$$

$$\lim_{x \to D} a_x > threshold,$$

where a denotes the desired acceleration of the vehicle 10, $V_i$ denotes the initial velocity of the vehicle 10, and $V_f$ denotes the final velocity of the vehicle 10. Here, when $a_x$ is less than a threshold acceleration, the transition module 240 identifies the handoff point 244 as a function of a deceleration level confidence and the current velocity $V_{vehicle}$ of the vehicle 10. Here, the handoff point 244 may include a target velocity $V_k$ and a target acceleration $a_k$, as follows:

$$\{V_k, a_k\} = K\{DecelLevel, V_{xvehicle}. \qquad (4)$$

Conversely, when $a_x$ is greater than a threshold acceleration, the transition module 240 may increase the reaction distance of the handoff point 244. In other words, the transition module 240 may set the handoff point 244 to transition from the open-loop longitudinal control 232 to the closed-loop longitudinal control 242 when the vehicle 10 is further away from the approaching cluster 402.

After the transition module 240 performs the transition optimization to determine the handoff point 244 for the vehicle 10, and when the vehicle 10 reaches the handoff point 244 (e.g., the velocity and/or deceleration), the longitudinal control system 200 transitions the controls from the open-loop longitudinal response 232 to the closed-loop longitudinal response 242. Notably, because the longitudinal control system 200 continues to receive sensor data 202 as the vehicle 10 moves along its route and approaches the cluster 402, the longitudinal control system may update the velocity of the vehicle when the one or more objects 304 in the approaching cluster 402 enter the high fidelity region 306 of the vehicle 10. In other words, as the vehicle 10 approaches the cluster 402, the velocity of the vehicle 10 may be updated if the existence of an object 304 is approved or rejected once within the high fidelity region 306 of the vehicle 10.

Figure 5:
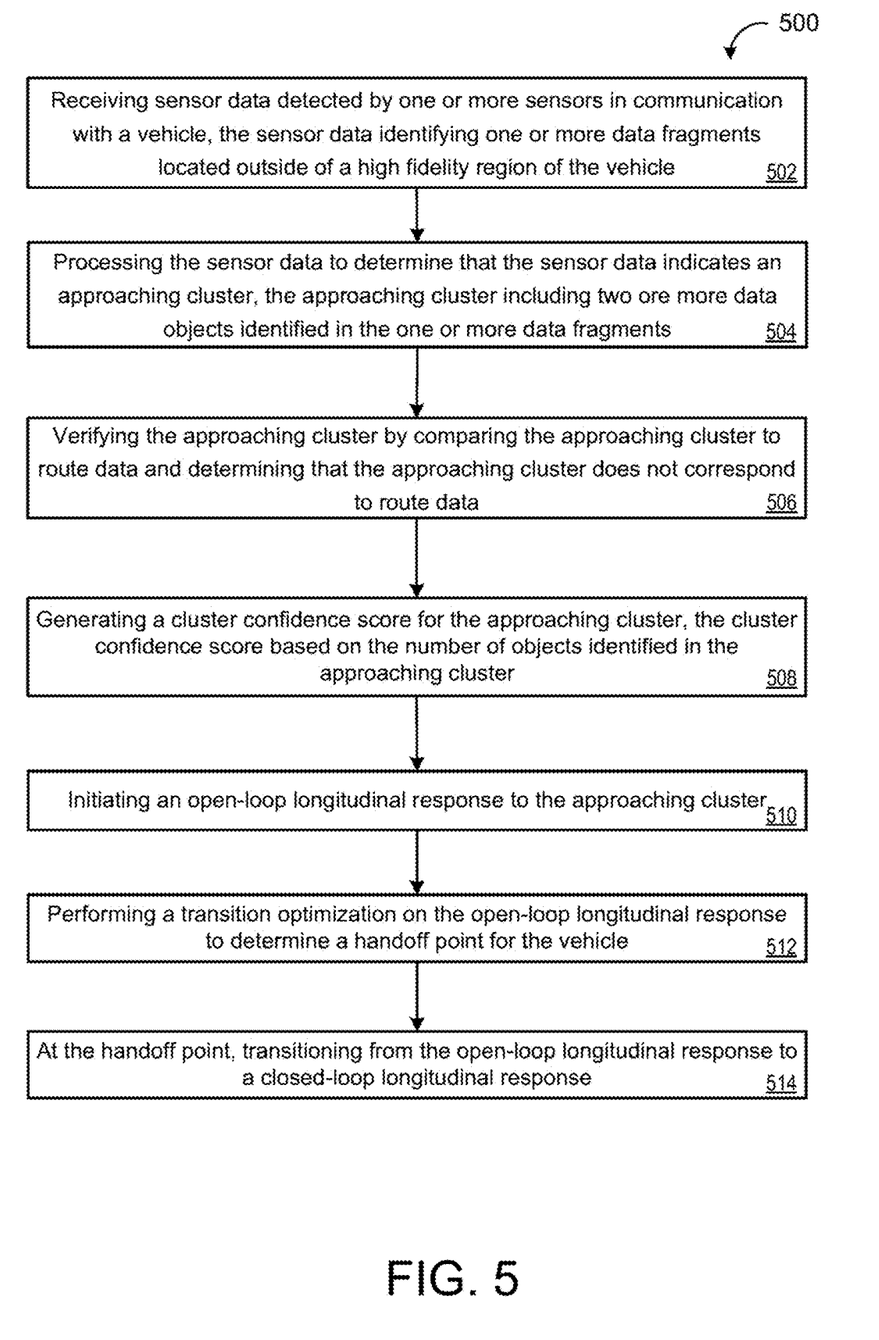
FIG. 5 is a flowchart of an example arrangement of operations for a method of longitudinal control on approach to a traffic cluster.

FIG. 5 includes a flowchart of an example arrangement of operations for a method 500 for longitudinal control on approach to a traffic cluster. At operation 502, the method 500 includes receiving sensor data 202 detected by one or more sensors 16 in communication with a vehicle 10, the sensor data 202 identifying one or more data fragments 302 located outside of a high fidelity region 306 of the vehicle 10. At operation 504, the method 500 also includes processing the sensor data 202 to determine that the sensor data indicates an approaching cluster 402, the approaching cluster including two or more data objects 304 identified in the one or more data fragments 302. At operation 506, the method 500 further includes verifying the approaching cluster 402 by comparing the approaching cluster to route data 204 and determining that the approaching cluster 402 does not correspond to the route data 204.

At operation 508, the method 500 also includes generating a cluster confidence score 222 based on the number of objects 304 identified in the approaching cluster 402. In some implementations the cluster confidence score 222 is higher when at least one of the number of objects 304 identified in the approaching cluster 402 is within a same lane as the vehicle 10. The method 500 further includes, at operation 510, initiating an open-loop longitudinal response 232 to the approaching cluster 402. At operation 512, the method 500 also includes performing a transition optimization on the open-loop longitudinal response 232 to determine a handoff point 242 for the vehicle 10. At operation 514, the method 500 further includes, at the handoff point 242 for the vehicle 10, transitioning from the open-loop longitudinal response 232 to a closed-loop longitudinal response 244.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:
   receiving sensor data detected by one or more sensors in communication with a vehicle, the sensor data identifying one or more data fragments located outside of a high fidelity region of the vehicle;
   processing the sensor data to determine that the sensor data indicates an approaching cluster, the approaching cluster including two or more data objects identified in the one or more data fragments;
   verifying the approaching cluster by comparing the approaching cluster to route data and determining that the approaching cluster does not correspond to the route data;
   generating a cluster confidence score for the approaching cluster, the cluster confidence score based on the number of objects identified in the approaching cluster;
   initiating an open-loop longitudinal response to the approaching cluster based on the cluster confidence score;
   performing a transition optimization on the open-loop longitudinal response to determine a handoff point for the vehicle; and
   at the handoff point, transitioning from the open-loop longitudinal response to a closed-loop longitudinal response.

2. The method of claim 1, wherein the one or more sensors in communication with the vehicle include at least one of a long range radar and a camera sensor.

3. The method of claim 1, wherein the one or more sensors are disposed within the vehicle.

4. The method of claim 1, wherein the route data comprises at least one of:
   road geometry;
   lane counts; or
   established structures.

5. The method of claim 1, wherein the cluster confidence score is further based on:
   a duration of time that each of the number of objects identified in the approaching cluster is detected;
   a velocity of each of the number of objects identified in the approaching cluster; and
   the distance between the vehicle and the approaching cluster.

6. The method of claim 1, wherein initiating an open-loop longitudinal response to the approaching cluster comprises determining a response level based on the cluster confidence score of the approaching cluster.

7. The method of claim 1, wherein performing the transition optimization on the open-loop longitudinal response to determine the handoff point for the vehicle comprises identifying a target velocity based on a current velocity of the vehicle, and transitioning from the open-loop longitudinal response to the closed-loop longitudinal response when a velocity of the vehicle equals the target velocity.

8. The method of claim 7, wherein the target velocity is further based on a cluster velocity of the approaching cluster and a distance between the vehicle and the approaching cluster.

9. The method of claim 1, wherein the one or more data fragments are identified by more than one of the one or more sensors.

10. The method of claim 1, further comprising updating a velocity of the vehicle when one or more objects enter the high fidelity region of the vehicle.

11. A system comprising:
    data processing hardware; and
    memory hardware in communication with the data processing hardware, the memory hardware storing instructions that when executed on the data processing hardware cause the data processing hardware to perform operations comprising:
       receiving sensor data detected by one or more sensors in communication with a vehicle, the sensor data identifying one or more data fragments located outside of a high fidelity region of the vehicle;
       processing the sensor data to determine that the sensor data indicates an approaching cluster, the approaching cluster including two or more data objects identified in the one or more data fragments;
       verifying the approaching cluster by comparing the approaching cluster to route data and determining that the approaching cluster does not correspond to the route data;
       generating a cluster confidence score for the approaching cluster, the cluster confidence score based on the number of objects identified in the approaching cluster;
       initiating an open-loop longitudinal response to the approaching cluster based on the cluster confidence score;
       performing a transition optimization on the open-loop longitudinal response to determine a handoff point for the vehicle; and
       at the handoff point, transitioning from the open-loop longitudinal response to a closed-loop longitudinal response.

12. The system of claim 11, wherein the one or more sensors in communication with the vehicle include at least one of a long range radar and a camera sensor.

13. The system of claim 11, wherein the one or more sensors are disposed within the vehicle.

14. The system of claim 11, wherein the route data comprises at least one of:
    road geometry;
    lane counts; or
    established structures.

15. The system of claim 11, wherein the cluster confidence score is further based on:
    a duration of time that each of the number of objects identified in the approaching cluster is detected;
    a velocity of each of the number of objects identified in the approaching cluster; and
    the distance between the vehicle and the approaching cluster.

16. The system of claim 11, wherein initiating an open-loop longitudinal response to the approaching cluster comprises determining a response level based on the cluster confidence score of the approaching cluster.

17. The system of claim 11, wherein performing the transition optimization on the open-loop longitudinal response to determine the handoff point for the vehicle comprises identifying a target velocity based on a current velocity of the vehicle, and transitioning from the open-loop longitudinal response to the closed-loop longitudinal response when a velocity of the vehicle equals the target velocity.

18. The system of claim 17, wherein the target velocity is further based on a cluster velocity of the approaching cluster and a distance between the vehicle and the approaching cluster.

19. The system of claim 11, wherein the one or more data fragments are identified by more than one of the one or more sensors.

20. The system of claim 11, further comprising updating a velocity of the vehicle when one or more objects enter the high fidelity region of the vehicle.

* * * * *